US012729330B2

(12) United States Patent
Cheng et al.

(10) Patent No.: US 12,729,330 B2
(45) Date of Patent: Sep. 8, 2026

(54) ENHANCED ADHESION OF COTTONSEED PROTEIN WITH CATECHOL-CONTAINING PROMOTERS

(71) Applicant: The United States of America, as represented by the Secretary of Agriculture, Washington, DC (US)

(72) Inventors: Huai N. Cheng, Metairie, LA (US); Michael K. Dowd, Metairie, LA (US); Zhongqi He, New Orleans, LA (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 131 days.

(21) Appl. No.: 18/934,291

(22) Filed: Nov. 1, 2024

(65) Prior Publication Data

US 2025/0109326 A1 Apr. 3, 2025

Related U.S. Application Data

(62) Division of application No. 17/144,329, filed on Jan. 8, 2021, now Pat. No. 12,157,843.

(60) Provisional application No. 62/970,799, filed on Feb. 6, 2020.

(51) Int. Cl.

| | |
|---|---|
| ***C09J 189/00*** | (2006.01) |
| ***B32B 37/12*** | (2006.01) |
| ***C08L 89/00*** | (2006.01) |

(52) U.S. Cl.

CPC ......... *C09J 189/00* (2013.01); *B32B 37/1207* (2013.01); *C08L 89/00* (2013.01); *B32B 2309/02* (2013.01); *B32B 2309/12* (2013.01); *B32B 2317/16* (2013.01)

(58) Field of Classification Search

CPC ................ C09J 189/00; B32B 37/1207; B32B 2309/02; B32B 2309/12; B32B 2317/16; C08L 89/00

See application file for complete search history.

(56) References Cited

U.S. PATENT DOCUMENTS

2004/0037906 A1* 2/2004 Li .......................... C09J 189/00 527/200

2020/0198177 A1* 6/2020 Kinio ................ C08G 18/3218

* cited by examiner

*Primary Examiner* — Jiangtian Xu

(74) *Attorney, Agent, or Firm* — John Fado; Maria Restrepo-Hartwig

(57) ABSTRACT

Disclosed herein are adhesive compositions containing a cottonseed protein and a catechol compound containing a carboxyl group, and optionally a carrier. Also disclosed are processes for producing an adhesive composition involving mixing a cottonseed protein and a catechol compound containing a carboxyl group, and optionally a carrier.

6 Claims, 3 Drawing Sheets

ENHANCED ADHESION OF COTTONSEED PROTEIN WITH CATECHOL-CONTAINING PROMOTERS

REFERENCE TO RELATED APPLICATION

This application is a divisional of U.S. patent application Ser. No. 17/144,329 filed on 8 Jan. 2021, and claims the benefit of U.S. Provisional Application No. 62/970,799, filed 6 Feb. 2020, which is incorporated herein by reference in its entirety.

BACKGROUND OF THE INVENTION

Disclosed herein are adhesive compositions containing a cottonseed protein and a catechol compound containing a carboxyl group, and optionally a carrier. Also disclosed are processes for producing an adhesive composition involving mixing a cottonseed protein and a catechol compound containing a carboxyl group, and optionally a carrier. Furthermore, there are disclosed methods of bonding a first article to a second article involving (a) producing an adhesive composition by mixing a cottonseed protein and a catechol compound containing a carboxyl group, and optionally a carrier at a pH of about 4 to about 12 and at a temperature of about 20° to about 60° C.; (b) depositing on a surface of said first article said adhesive composition thereby creating a binding area; and (c) contacting said binding area with a surface of said second article; and (d) applying heat and pressure to bond said first article to said second article. There are also disclosed adhesive products containing the above adhesive composition. Also disclosed are products containing a first article bonded to a second article by the above method. In addition, there are disclosed methods of producing a composite material involving (a) combining wood strands, particles, fibers, or veneers with the above adhesive composition to produce a mixture; and (b) curing the mixture produced by step (a) to produce the composite material.

The global wood adhesives and binders market is valued at $15 billion with a volume of 18,126 kilo tons in 2016 (Zion Marketing Research, 2018, https://www.zionmarketresearch.com/news/wood-adhesives-binders-market). The adhesive formulations most used contain formaldehyde resins (e.g., urea-formaldehyde, phenol-formaldehyde, and melamine-urea-formaldehyde), and polyurethanes due to their adhesive properties (Zion Marketing Research, 2018; Ferdosian, F., et al., Polymers, 9:70 (2017); Hemmila, V., et al., RSC Adv., 7: 38604-38630 (2017); Pizzi, A., and K. L. Mittal, Handbook of adhesive technology, CRC Press, Boca Raton, FL (2017); He, Z., Bio-based wood adhesives: preparation, characterization, and testing, CRC Press, Boca Raton, FL (2017a)). Because the synthesis of these resins entails either formaldehyde (for formaldehyde resins) or isocyanates (for polyurethanes), their use requires safety precautions to minimize exposure to production workers, and their disposal can create environmental problems (ASI, 2013, Formaldehyde and health risks, https://www.adhesivesmag.com/articles/92074-formaldehyde-and-health-risks; Hybrid Coatings, 2015, Dangers of polyurethane, https://hybridcoatingtech.com/dangers-of-polyurethane.html). Thus, considerable work has focused on developing agro-based, less hazardous, and more eco-friendly adhesives (Ferdosian at al., 2017; Hemmila et al., 2017; Pizzi and Mittal, 2017; He, 2017a).

Proteins have been used as "green" wood adhesives. Among the proteins, soy protein has garnered the most attention (Vnučec, D., et al., J. Adhes. Sci. Technol., 31: 910-931 (2017); Frihart, C. R., and M. J. Birkeland, Amer. Chem. Soc. Symp. Ser., 1178: 167-192 (2014); Sun, S., and K. Bian, J. Am. Oil Chem. Soc., 76: 977-980 (1999); Zhong Z., et al., Int. J. Adhes. Adhes., 22: 267-272 (2002); Liu, Y., and K. Li., Int. J. Adhes. Adhes., 27: 59-67 (2007)) and industrial wood adhesives based on soy protein are now commercially available (Solenis, Soyad™ Adhesive Technology, 2020, https://solenis.com/en/industries/specialties-wood-adhesives/innovations/soyad-adhesive-technology/; Columbia Forest Products, Purebond Hardwood Plywood, 2020, http://purebondplywood.com/product/purebond-plywood/; Cargill, Industrial Soy Flour Adhesives, 2020, https://www.cargill.com/bioindustrial/industrial-soy-flour). Without modification, soy protein-based adhesives have acceptable dry adhesive strength, comparable to formaldehyde-based resins, but their water resistance is inferior. In order to improve the end-use properties for soy proteins, several modifiers have been reported for soy proteins, including denaturants (e.g., sodium dodecyl sulfonate, urea, and guanidine hydrochloride) (Sun and Bian, 1999; Zhong et al., 2002; Huang, W., and X. Sun, J. Am. Oil Chem. Soc., 77: 101-104 (2000a); Huang, W., X. Sun, J. Am. Oil Chem. Soc., 77: 705-708 (2000b); Cheng, H. N., et al., J. Adhes. Sci. Technol., 31: 2657-2666 (2017a)), plasticizers (Mo, X., and X. Sun, J. Am. Oil Chem. Soc., 79: 197-202 (2002)), cationic detergents (Wang, Y., et al., J. Am. Oil Chem. Soc., 82: 357-363 (2005)), ethylene glycol and its polymers (Chen, M., et al., BioResources, 10: 41-54 (2015)), cationic polyacrylamide (Xu, H., et al., BioResources, 9: 4667-4678 (2014)), cationic poly(aminoamide) (Li, K., et al., J. Am. Oil. Chem. Soc., 81: 487-91 (2004a); Zhong, Z., et al., J. Appl. Polym. Sci., 130: 2261-2270 (2007); Allen, A. J., et al., Forest Prod. J., 60: 534-540 (2010)), clay (Zhang, Y., et al., BioResources, 8: 1283-1291 (2013)), calcium carbonate (Liu, D., et al., Bioresour. Technol., 101: 6235-6241 (2010)), combinations of acid, base, and salt (Lin, Q., et al., Int. J. Adhes. Adhes., 34: 11-16 (2012)), biomass lignin (Pradyawong, S., et al., Int. J. Adhes. Ahes., 75: 66-73 (2017)), epoxy resin and polyacrylamide (Wang, Z., et al., RSC Adv., 9: 35273-35279 (2019)), blood meal, diglycidyl-containing compound, and zinc ions (Bai, Y., et al., Polymers, 12: 756 (2020), and reactions to increase free mercapto content (Liu, Y., et al., Macromol Rapid Commun., 5: 1835-1838 (2004)).

Cottonseed protein is a byproduct of cotton production and can be considered an attractive choice as a component for wood adhesive formulations. Previously, cottonseed protein isolate was found to have comparable or better dry adhesive strength relative to soy protein but it exhibited improved hot water resistance (Cheng, H. N., et al., Ind. Crops Prod., 46: 399-403 (2013)). Cottonseed protein isolate (CPI) has been blended into soy protein in order to improve the soy protein's dry adhesive strength and hot water resistance (Cheng, H. N., et al., Ind. Crops Prod., 85: 324-330 (2016a). Additionally, a number of studies have discussed the adhesive effects of various additives combined with cottonseed protein. Small molecules bearing a carboxylic functionality have been shown to enhance the dry adhesive strength but not the hot-water resistance of cottonseed protein (Cheng, H. N., et al., Int. J. Adhes. Adhes., 68: 156-160 (2016b)). Several phosphorus-containing compounds have been found to enhance both dry strength and hot water resistance of cottonseed protein but showed no effect on soy protein (Cheng, H. N., et al., Int. J. Adhes. Adhes., 77: 51-57 (2017b)). Anionic polysaccharides (e.g., carboxymethyl cellulose and low methoxy pectin) displayed significantly enhanced cottonseed protein's adhesive properties; other anionic polysaccharides (e.g., alginate and carrageenans) showed intermediate effects, whereas anionic vinyl polymers exhibited even weaker effects (Cheng, H. N., et al., J. Adhes. Sci. Technol., 33: 1357-1368 (2019a)). These enhancements found with polymer addition occurred for cottonseed protein but not for soy protein. More recently, nanocellulose (both cellulose nanofibers and nanocrystals) was found to enhance the adhesive performance of both soy- and cottonseed-based adhesives (Cheng et al., 2019b).

As part of the effort to improve the performance/cost ratio of proteins, non-ionic polysaccharides (e.g., starch, cellulose, and xylan) have been used as fillers for cottonseed and soy protein (Cheng et al., 2016a). Up to 50% of these polysaccharides can be added without losing the adhesive properties of the protein. Alternatively, water- or buffer-washed cottonseed meals were found to be lower-cost alternatives to cottonseed protein isolate (He, Z., et al., Int. J. Adhes. Adhes., 50: 102-106 (2014); He, Z., et al, Production of plywood panels using washed cottonseed meal as bonding reagents, Proc. of the Forest Products Society's 72nd International Convention, Jun. 11-15, 2018, Madison, Wisconsin, p. 1-10). The adhesive performance of the washed cottonseed meals and cottonseed protein isolate was found to be similar. The washing process was recently scaled up and shown to be feasible for production (He, Z., and F. Chiozza, J. Mater. Sci. Res., 6: 20-26 (2017b)).

We have developed adhesive compositions containing cottonseed protein and other components (e.g., compounds containing both catechol and carboxyl moieties) and surprisingly found that they exhibited improved adhesive strength. For comparison, we have also included soy protein isolate (SPI) in our study.

SUMMARY OF THE INVENTION

Disclosed herein are adhesive compositions containing a cottonseed protein and a catechol compound containing a carboxyl group, and optionally a carrier. Also disclosed are processes for producing an adhesive composition involving mixing a cottonseed protein and a catechol compound containing a carboxyl group, and optionally a carrier. Furthermore, there are disclosed methods of bonding a first article to a second article involving (a) producing an adhesive composition by mixing a cottonseed protein and a catechol compound containing a carboxyl group, and optionally a carrier at a pH of about 4 to about 12 and at a temperature of about 20° to about 60° C.; (b) depositing on a surface of said first article said adhesive composition thereby creating a binding area; and (c) contacting said binding area with a surface of said second article; and (d) applying heat and pressure to bond said first article to said second article. There are also disclosed adhesive products containing the above adhesive composition. Also disclosed are products containing a first article bonded to a second article by the above method. In addition, there are disclosed methods of producing a composite material involving (a) combining wood strands, particles, fibers, or veneers with the above adhesive composition to produce a mixture; and (b) curing the mixture produced by step (a) to produce the composite material.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

Exemplary

Exemplary FIG. 2A shows TGA and FIG. 2B shows DTG for CPI control, CPI with 45 mM gallic acid, CPI with 45 mM caffeic acid, and CPI with 45 mM catechol. FIG. 2C shows TGA and FIG. 2D shows DTG of CPI control, CPI with 179 mM gallic acid, CPI with 179 mM caffeic acid, and CPI with 179 mM catechol as described herein. CPI control (solid line), CPI with gallic acid (long dash line), CPI with caffeic acid (dash line), and CPI with catechol (dot line). The Y axis in FIG. 2A and FIG. 2C display the weight loss; the Y axis in FIG. 2B and FIG. 2D display the derivative of weight loss. The X axis displays the temperature in degrees Celsius (deg. C).

Exemplary

DETAILED DESCRIPTION OF THE INVENTION

Figure 1:
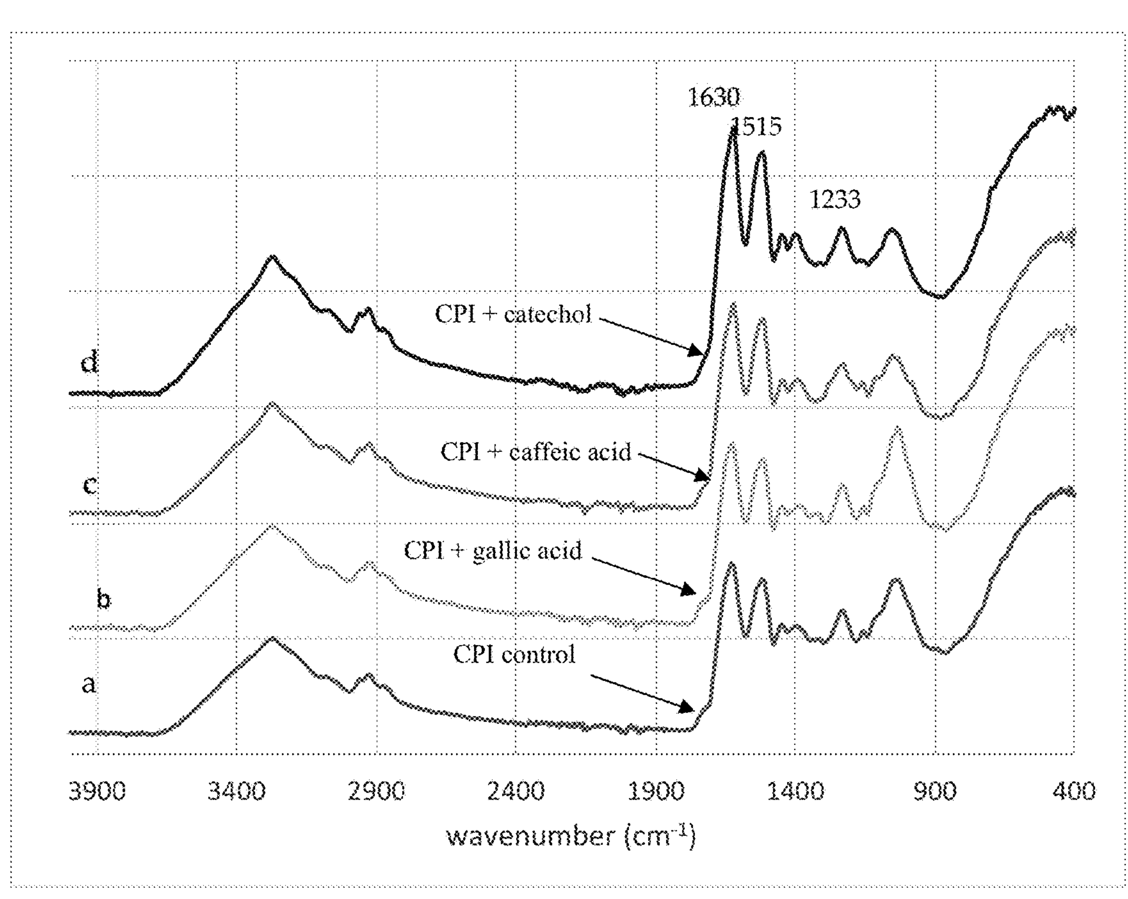
FIG. 1 shows FT-IR spectra of (a) CPI control, (b) CPI with 45 mM gallic acid, (c) CPI with 45 mM caffeic acid, and d) CPI with 45 mM catechol as described herein. The X axis shows the wavenumber ($cm^{-1}$).

Disclosed herein are adhesive compositions containing a cottonseed protein and a catechol compound containing a carboxyl group, and optionally a carrier. Also disclosed are processes for producing an adhesive composition involving mixing a cottonseed protein and a catechol compound containing a carboxyl group, and optionally a carrier. Furthermore, there are disclosed methods of bonding a first article to a second article involving (a) producing an adhesive composition by mixing a cottonseed protein and a catechol compound containing a carboxyl group, and optionally a carrier at a pH of about 4 to about 12 and at a temperature of about 20° to about 60° C.; (b) depositing on a surface of said first article said adhesive composition thereby creating a binding area; and (c) contacting said binding area with a surface of said second article; and (d) applying heat and pressure to bond said first article to said second article. There are also disclosed adhesive products containing the above adhesive composition. Also disclosed are products containing a first article bonded to a second article by the above method. In addition, there are disclosed methods of producing a composite material involving (a) combining wood strands, particles, fibers, or veneers with the above adhesive composition to produce a mixture; and (b) curing the mixture produced by step (a) to produce the composite material.

We developed adhesive compositions containing cottonseed protein and other components and surprisingly found that they exhibited improved adhesive strength. These other components include catechol compounds containing carboxyl moiety (e.g., gallic acid (left), or caffeic acid (right):

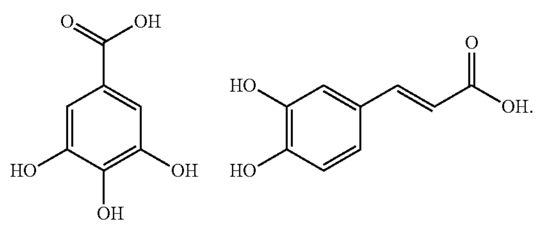 [SMILES: O=C(O)c1cc(O)c(O)c(O)c1 ; O=C(O)/C=C/c1ccc(O)c(O)c1]

Catechol is a dihydroxybenzene comprising a benzene core carrying two hydroxy substituents ortho to each other:

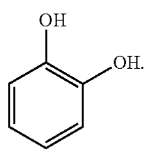

The catechol compound containing a carboxyl group is understood to mean a compound that contains both catechol and carboxyl moieties, which is not covalently attached to the protein. The catechol containing compounds have a carboxyl group attached to the catechol (resulting in, for example, gallic acid or caffeic acid; the carboxyl group is not attached ortho to the hydroxy substituents on the benzene ring). Other catechol-like compounds include 3,4-dihydroxybenzoic acid (left) and 3,4-dihydroxyhydrocinnamic acid (right):

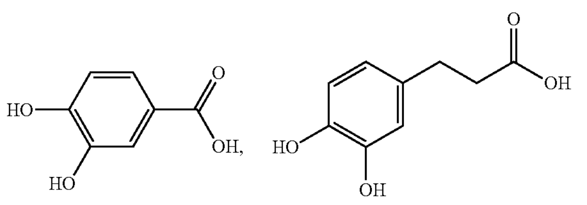 [SMILES: O=C(O)c1ccc(O)c(O)c1 ; O=C(O)CCc1ccc(O)c(O)c1]

These compounds have the generic formula as shown below:

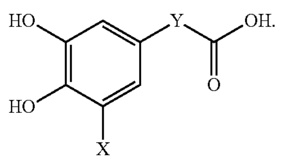

where X=H or OH, and Y can be 0-2 carbons in length, with or without a double bond.

Cottonseed protein includes cottonseed protein isolate, cottonseed protein concentrate, cottonseed protein meal and flour, water-washed cottonseed protein meal and flour, and buffer-washed cottonseed protein meal and flour. Soy protein includes soy protein isolate, soy protein concentrate, soy protein flour, buffer-washed and water-washed soy protein meal and flour. Although a fair amount of variation occurs depending on the procedures used, in general a protein meal contains about 40% (e.g., 40%) protein, a protein flour contains about 50% (e.g., 50%) protein, a protein concentrate contains about 70% (e.g., 70%) protein, and a protein isolate contains about 90% (e.g., 90%) protein. Through appropriate washing with water or buffer (e.g., sodium phosphate), the protein content of protein meal or flour may be increased.

The adhesive compositions described herein can be used in a variety of different applications, which include, for example, bonding together many different types of wood substrates and/or creating composite wood materials.

The adhesive compositions may be produced by mixing cottonseed protein and a catechol-containing compound.

Also disclosed are methods of bonding a first article to a second article. The methods involve the steps of (a) producing an adhesive composition by mixing cottonseed protein and a catechol compound containing a carboxyl group in an aqueous solution, and optionally a carrier at a pH of about 4 to about 12 and at a temperature of about 20° to about 60° C.; (b) depositing on a surface of the first article the adhesive composition thereby creating a binding area; and (c) contacting the binding area with a surface of the second article; and (d) applying heat and pressure to bond the first article to said second article.

The adhesive compositions can be applied to the surfaces of substrates in any conventional manner. Alternatively, the surfaces can be coated with the composition by spraying, or brushing, doctor blading, wiping, dipping, pouring, ribbon coating, combinations of these different methods, and the like.

In addition, there are disclosed methods of producing a composite material. The methods involve the steps of (a) combining a first article and a second article with any one of the foregoing adhesive compositions to produce a mixture; and (b) curing the mixture produced by step (a) to produce the composite material. The curing can comprise applying pressure, heat or both pressure and heat to the mixture.

In certain embodiments, the first article, the second article, or both the first and second articles are lignocellulosic materials, or composite materials containing lignocellulosic material. The first article, the second article, or both the first and second articles can comprise a metal, a resin, a ceramic, a polymer, a glass or a combination thereof. The first article, the second article, or both the first article and the second article can be a composite. In addition, provided are articles produced by each of the foregoing methods of manufacture.

In addition, there is provided articles comprising two or more components bonded together using one or more of the adhesive compositions described herein. The bonded components can be selected from the group consisting of paper, wood, glass, metal, fiberglass, wood fiber, ceramic, ceramic powder, plastic (for example, a thermoset plastic), and a combination thereof. In certain other embodiments, the bonded components can be selected from the group consisting of paper, wood, glass, metal, fiberglass, wood fiber, ceramic, ceramic powder, sand, plastic (for example, a thermoset plastic), and a combination thereof. Also provided are articles (for example, a composite material, laminate, or a laminate containing composite material) produced using one or more of the adhesive compositions described herein.

The composite material can be chip board, particle board, fiber board, plywood, laminated veneer lumber, glulam, laminated whole lumber, laminated composite lumber, composite wooden I-beams, medium density fiberboard, high density fiberboard, orientated strand board, extruded wood, or fiberglass. The composite can be a thermosetting composite or a thermoplastic composite.

In certain embodiments, the article is a composite, such as a random non-oriented homogeneous composite, an oriented composite, or a laminated composite.

In certain embodiments, the article comprises a lignocellulosic component. Furthermore, the article can comprise paper, wood, glass, fiberglass, wood fiber, ceramic, ceramic powder, or a combination thereof.

In certain embodiments, the article is a particle board composite. The amount of wood and adhesive composition used to prepare the particle board composite can be adjusted to optimize the performance properties of the particle board for different applications (e.g., outdoor use where increased water resistance is desirable). In certain embodiments, the composite comprises at least about 80% (w/w) wood, at least about 90% (w/w) wood, at least about 95% (w/w) wood, or at least about 98% (w/w) wood.

The adhesives described herein can be used in the production of a variety of wood-based products including composite materials, laminates, and laminates that contain composite materials. For example, the adhesives can be used in the production of consolidated wood composites, for example, chipboard (also known as OSB), fiberboard, and related composite wood products, as well as in the production of engineered lumber composites, for example, I-beams (I-joists), laminated veneer lumber (LVL), and other types of structural lumber composites.

The invention also provides a method of producing a composite material. The method comprises the steps of (a) combining a first article and a second article with any one of the foregoing adhesive compositions to produce a mixture; and (b) curing the mixture produced by step (a) to produce the composite material. The curing can comprise applying pressure, heat or both pressure and heat to the mixture.

The terms "substrate", "adhered" and "article" are interchangeable and refer to the substances being joined, bonded together, or adhered using the methods and compositions described herein. In certain embodiments, the first article, the second article or both the first and second articles are wood, lignocellulosic materials, or composite materials containing lignocellulosic material. Furthermore, the first article, the second article or both the first and second articles can comprise a metal, a resin, a ceramic, a polymer, a glass or a combination thereof. It is understood that the first article, the second article, or both the first article and the second article can be a composite.

The compositions can be used to bond multiple lignocellulosic materials (adherends) together to prepare composite wood products. Furthermore, it is understood that at least one of the adherends bonded together and/or included in the composite can be wood, wood fiber, paper, rice hulls, fiberglass, ceramic, ceramic powder, plastic (for example, thermoset plastic), cement, stone, cloth, glass, metal, corn husks, bagasse, nut shells, polymeric foam films or sheets, polymeric foams, fibrous materials, or combinations thereof.

The amount of adhesive composition applied to the adhesive bond between substrates may vary considerably from one end use application, or type of adhesive used, or type of substrate, to the next. The amount of adhesive should be sufficient to achieve the desired bond strength and bond durability under a given set of test conditions.

The amount of an adhesive composition applied (when dried) may be in the range of from about 1 to about 30 grams per square foot (e.g., 1 to 30 grams per square foot), preferably from about 3 to about 20 grams per square foot (e.g., 3 to 20 grams per square foot), more preferably from about 5 to about 10 grams per square foot (e.g., 5 to 10 grams per square foot) of bond surface area (i.e., the bond surface area being the area of overlap between the substrates to be bonded by the adhesive composition).

The adhesive compositions can be used to fabricate multi-substrate composites or laminates, particularly those comprising lignocellulosic or cellulosic materials, such as wood or paper. The adhesives can be used to prepare products such as plywood, laminated veneer lumber (LVL), waferboard (also known as chipboard or OSB), particle board, fiberboard, fiberglass, composite wooden I-beams (I-joists), and the like.

The adhesive compositions can also be used to fabricate composite materials, which include, for example, chip board, particle board, fiber board, plywood, laminated veneer lumber, glulam, laminated whole lumber, laminated composite lumber, composite wooden I-beams, medium density fiberboard, high density fiberboard, extruded wood, or fiberglass.

Under certain circumstances, pressure and heat can be used to facilitate curing. The amount of pressure and the time period for which the pressure is applied are not limited and specific pressures and times will be evident to one skilled in the art from the present disclosure (see the various Examples). In certain embodiments, a pressure of about 0.4 MPa to about 14 MPa (e.g., 0.4 MPa to 14 MPa) is applied from about 2 minutes to about 2 hours (e.g., 2 minutes to 2 hours), preferably from about 10 minutes to about 2 hours (e.g., 10 minutes to 2 hours), preferably from about 2 minutes to about 30 minutes (e.g., 2 minutes to 30 minutes), or more preferably from about 5 minutes to about 30 minutes (e.g., 5 minutes to 30 minutes) (depending on the temperature). The pressure, heating, or application of both pressure and heat may promote curing and also decrease the viscosity adhesive compositions described herein, facilitating their flow in the contact area, such that a bonding region is created whereby there is a continuum between the adherends. The amount of pressure, heat time or their combination can be optimized to ensure such continuum and will depend on the adherends' physical or chemical properties as well as on the rate of the adhesive's viscosity-build throughout the cure cycle.

Other compounds (e.g., a second adhesive) may be added to the composition provided they do not substantially interfere with the intended activity and efficacy of the composition; whether or not a compound interferes with activity and/or efficacy can be determined, for example, by the procedures utilized below.

The amounts, percentages and ranges disclosed herein are not meant to be limiting, and increments between the recited amounts, percentages and ranges are specifically envisioned as part of the invention.

"Optional" or "optionally" means that the subsequently described event or circumstance may or may not occur, and that the description includes instances in which said event or circumstance occurs and instances where it does not. For example, the phrase "optionally comprising a second adhesive" means that the composition may or may not contain a second adhesive and that this description includes compositions that contain and do not contain a second adhesive. Also, by example, the phrase "optionally adding a second adhesive" means that the method may or may not involve adding a second adhesive and that this description includes methods that involve and do not involve adding a second adhesive.

By the term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

The compositions optionally contain a carrier (e.g., agronomically or physiologically or pharmaceutically acceptable carrier). The carrier component can be a liquid or a solid material. The term "carrier" as used herein includes carrier materials such as those described below. As is known in the art, the vehicle or carrier to be used refers to a substrate such as water, aqueous emulsion, plasticizer and mixtures thereof. Suitable carriers are well-known in the art and are selected in accordance with the ultimate application of interest. Agronomically acceptable substances include water, aqueous emulsions, aqueous solutions, glycerol, ethylene glycol, sorbitol, and other polyhydroxy compounds. The cottonseed protein and the modifier (catechol compound containing a carboxyl group) are usually dissolved in water. The addition of a plasticizer is possible.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments and characteristics described herein and/or incorporated herein. In addition, the invention encompasses any possible combination that also specifically excludes any one or some of the various embodiments and characteristics described herein and/or incorporated herein.

The amounts, percentages and ranges disclosed herein are not meant to be limiting, and increments between the recited amounts, percentages and ranges are specifically envisioned as part of the invention. All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10 including all integer values and decimal values; that is, all subranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions (e.g., reaction time, temperature), percentages and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. As used herein, the term "about" refers to a quantity, level, value, or amount that varies by as much as 10% to a reference quantity, level, value, or amount. For example, about 1.0 g means 0.9 g to 1.1 g and all values within that range, whether specifically stated or not.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

Materials: Gallic acid, caffeic acid, and catechol were acquired from Sigma-Aldrich (St. Louis, MO). SPI (soy protein isolate) was supplied by Archer Daniels Midland Company (Pro-Fam 781, Decatur, IL). The nitrogen content of SPI was 14.2%, and 3 g of this protein dispersed in 25 g water had a pH of about 6.75. Cottonseed protein isolate (CPI) was obtained from a previously reported procedure (Cheng et al., 2013; Dowd M. K., and M. P. Hojilla-Evangelista, Amer. Chem. Soc. Symp. Ser., 1144: 343-357 (2013), where defatted glandless cotton seed (in powder form) was partly dissolved in water at pH 11, filtered, and the filtrate neutralized to pH 5 to precipitate out the protein. The nitrogen content of this material was about 16%, and a 3:25 (w/w) aqueous dispersion had a pH of about 4.8.

Maple wood veneer (0.159 cm thickness) was purchased from Oakwood Veneer Company (Troy, MI) and cut into strips 1.27 cm in width×8.89 cm in length for dry adhesive testing, or 2.54 cm×8.89 cm for hot water resistance and soak tests. In all cases, the wood grain was parallel to the long dimension of each strip.

Wood Specimen Preparation and Assembly: The procedure used was similar to what was reported earlier (Cheng et al., 2013; Cheng et al., 2016a). For a given adhesive formulation, specific amounts of CPI (or SPI) and modifier were dispersed in distilled water to give 12.5 g of adhesive slurries with 12% protein content and 0, 45 and 179 mM modifiers (e.g., gallic acid, caffeic acid, catechol). Thus, 1.5 g of CPI and 0.106 g gallic acid, 0.113 g caffeic acid, or 0.069 g catechol were added to water to give the total weight of 12.5 g, yielding 12% protein in 45 mM modifier. Similarly, 1.5 g of CPI and 0.425 g gallic acid, 0.450 g caffeic acid, or 0.275 g catechol were added to water to give the total weight of 12.5 g, yielding 12% protein in 179 mM modifier. The aqueous mixtures were stirred for 2 h at room temperature to ensure complete dissolution of the modifier and full interaction between the protein and the modifier. The pH of each slurry was adjusted to the same value as the protein by itself. For dry adhesive testing, approximately 0.025 g (dry basis) of each adhesive slurry was brushed evenly onto the surfaces at the end of two wood strips with an application area of 1.27×2.54 cm (width×length). These strips were allowed to partially dry at room temperature for 15 min. The application areas of two strips were overlain and hot pressed at 2.76 MPa and 80° C. for 20 min. For hot water resistance and soak tests, approximately 0.05 g (dry basis) of each adhesive slurry was brushed evenly on the surface of two strips with an application dimension of 2.54×2.54 cm (width×length). The strips were allowed to air dry at room temperature for 15 min, and the applied areas were overlain and pressed at 1.38 MPa and 100° C. for 10 min. Ten pairs of strips were prepared and evaluated for each formulation and adhesive test.

Adhesion Performance Measurements: All adhesive strengths were measured with a Zwick tensile tester (Model Z005, Ulm, Germany). The instrument was operated in the lap shear mode with a crosshead speed of 1 mm/min.

For dry adhesion strength, the bonded strips were tested directly on the tensile tester. The maximum tensile strength at break (MPa) was taken as the adhesive strength.

For hot water resistance test, the testing procedure was the same as used in prior cottonseed reports (Cheng et al., 2013; Cheng et al., 2016a), as adapted from earlier publications (Sun and Bian, 1999; Liu and Li, 2004; Liu and Li, 2007; Li, K., et al., Int. J. Adhes. Adhes., 24: 327-333 (2004b) and ASTM D1151-00 (Standard practice for effect of moisture and temperature on adhesive bonds (D1151-00), American Society of Testing and Materials, Philadelphia (PA), 2013, pp. 73-75). The ten bonded wood strips were immersed in 63±2° C. water for 4 h, cooled at room temperature for 24 h, re-immersed in 63±2° C. water for 4 h, and finally cooled with tap water. The hot water treated wood strips were then air-dried for at least 24 h before being evaluated for tensile strength. The maximum tensile strength at break (MPa) was regarded as the hot water resistance value.

The procedure for determining soak strength was also adapted from prior literature (He, Z., et al., Polymers, 9: 675 (2017c); Li, J., et al., J. Cleaner Prod., 229: 454-462 (2019)). The bonded wood strips were soaked in tap water (24±1° C.) for 48 hours, removed from water, and placed between paper towels for an average of 30 min. They were then evaluated on the tensile teste, where the maximum tensile strength at break (MPa) was recorded as the soak tensile strength.

Characterization Methods: Thermogravimetric analysis (TGA) of the adhesive scraped from the bonded strips after dry tensile testing was performed with a thermogravimetric analyzer (Model Q500, TA Instruments, New Castle, DE). Samples with weights between 3.0 and 8.0 mg were heated from 25° to 600° C. at a rate of 10° C./min in nitrogen. Data were processed with TA Instruments Universal Analysis 2000 software and transferred to an Excel spreadsheet for figure preparation.

FT-IR spectroscopy was conducted in the ATR mode on adhesives scraped from bonded strips using a Bruker Alpha Platinum-ATR spectrometer (Billerica, MA) coupled with the Opus software. Samples were dried at 80° to 100° C. overnight in a vacuum oven prior to analysis. For each sample, sixty-four scans were recorded between 400 and 4000 $cm^{-1}$ with a spectral resolution of 4 $cm^{-1}$.

Statistical Analysis: Except otherwise noted, all mechanical measurements were done on ten replicates and the data presented as mean±standard deviation. Analysis of variance and a Tukey means comparison test ($p<0.05$) were used to assess the differences in the test data using the build-in statistical functions in Excel.

Results and discussion. Adhesive Performance: Table 1 shows the three tensile strengths (dry, hot water treated, and water-soaked) of wood strips bonded by CPI alone and with the 45 and 179 mM concentrations of the three catechol-containing modifiers. The modifiers showed somewhat different behavior depending on their structures and concentrations. Surprisingly, gallic acid improved the dry adhesive performance of CPI by 18% and 28% at 45 mM and 179 mM, respectively, and caffeic acid improved the dry adhesive performance by 36% and 40% at 45 mM and 179 mM, respectively. In contrast, catechol only showed a marginal improvement over CPI (about 14%), which was not statistically significant.

Water resistance can be an important factor for some wood adhesion applications. Surprisingly, 45 mM gallic acid showed 46% improved hot water resistance and 45 mM caffeic acid showed 27% improved hot water resistance relative to CPI control. Reduced performance, however, was observed at 179 mM. As with the dry adhesion test, 45 mM catechol only showed a marginal improvement in hot water strength compared with CPI alone, which was not statistically significant. At 179 mM catechol, reduced hot water resistance was also observed relative to the control CPI.

For the soak test, only modest improvements were obtained for gallic and caffeic acid at 45 mM (about 7 and 12%, respectively) relative to CPI control. In contrast, catechol showed no effect. However, at 179 mM, all three modifiers showed reduced soak performance relative to CPI control. In a recent study of cottonseed protein with calcium cations and phosphate, only low enhancement in soak performance was observed (Li et al., 2019).

From the above results for CPI with the three modifiers, it appears that the combination of a catechol structure and carboxylic acid moieties were surprisingly necessary to improve the adhesive performance of CPI. It is of interest that for the dry tests, the higher dose (179 mM) enhanced the performance, but for the hot water resistance and soak tests the lower 45 mM concentration surprisingly performed better.

The corresponding evaluations with SPI (Table 2) showed only modest improvements in dry adhesive performance with the addition of gallic acid, caffeic acid, and catechol. At both 45 mM and 179 mM concentrations, these modifiers improved the dry adhesive strength by about 2-17% (relative to SPI control), and for most part these were not statistically significant. For the hot water resistance test, most of the SPI bonded wood strips fell apart during hot water treatment (Table 2). Only two bonded strips at 179 mM caffeic acid and one bonded strip at 45 mM catechol survived hot water treatment, and the hot water resistance data were obtained from these bonded strips. Likewise, most of the SPI bonded wood strips fell apart during the cold water soaking. Only two wood strips of SPI control, one wood strip with 45 mM caffeic acid and one strip with 179 mM caffeic acid survived the soak treatment, and tensile strength could be measured from these bonded strips. The few surviving SPI bonded strips gave low tensile strength values for these tests.

Characterization: The CPI/modifier samples scraped from wood strips used for the dry tensile testing were analyzed by FT-IR spectroscopy (FIG. 1) and TGA (FIG. 2). The FT-IR spectrum of CPI ((a) in FIG. 1) contained three diagnostic amide (I-III) peaks for protein: 1630 $cm^{-1}$, 1515 $cm^{-1}$, and ca. 1233 $cm^{-1}$ (Cheng et al., 2017b; Barth, A., Biochim Biophys Acta, 1767: 1073-1101 (2007); Krimm, S., and J. Bandekar, Adv. Protein Chem., 38, 181-364 (1986); Cheng, H. N., et al., Int. J. Polym. Anal. Charac., 22: 699-708 (2017c)). The amide I peak has been attributed to C═O stretching vibration and (to a lesser extent) C—N stretching vibration, C—C—N deformation, and N—H in-plane bending (Barth, 2007). The amide II peak has been attributed to N—H in-plane bending and C—N stretching vibrations. The origin of the amide III peak appears to be more complicated with many contributing vibration modes (Barth, 2007).

The FT-IR spectra of the CPI with the three modifiers (b-d in FIG. 1) confirmed that the main component of these materials was protein; however, in the 900-1700 $cm^{-1}$ region, minor differences from the CPI spectrum could be discerned. The catechol functionality is known to have absorptions between 1470 and 1622 $cm^{-1}$ attributed to aromatic ring C—C vibration bands and absorptions at 1281 and 1250 $cm^{-1}$ due to C—O vibrational bands (Aktas et al., 2003). These peaks probably contribute to the minor spectral differences between the samples. In prior work it has been reported (Barth 2007; Krimm and Bandekar, 1986; Cheng et al . . . , 2019b) that carboxylic moieties interact with protein through hydrogen bonding resulting in a slight shift of about 4 $cm^{-1}$ in the amide I peak (1630 $cm^{-1}$). However, the catechol functionality in gallic and caffeic acids gives rise to an IR peak at 1622 $cm^{-1}$ (Aktas, N., et al., J. Polym. Environ., 11: 123-128 (2003)), and this peak overlap did not permit the shift of the 1630 $cm^{-1}$ peak to be observed.

Figure 2A:
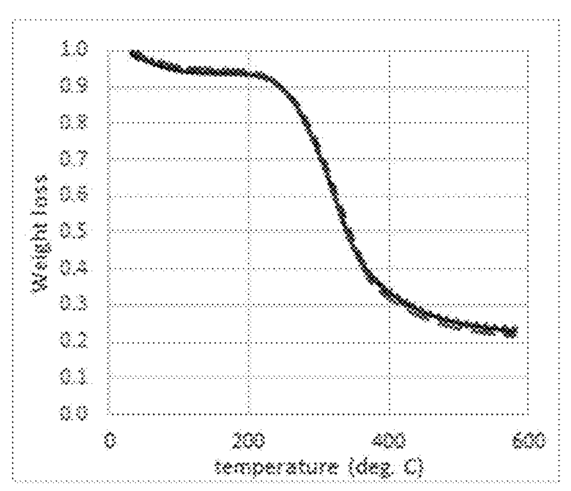
FIG. 2A to FIG. 2D depict graphs of the thermogravimetric analysis (TGA) and derivative thermogravimetry (DTG) of the adhesive scraped from the bonded strips.
Figure 2B:
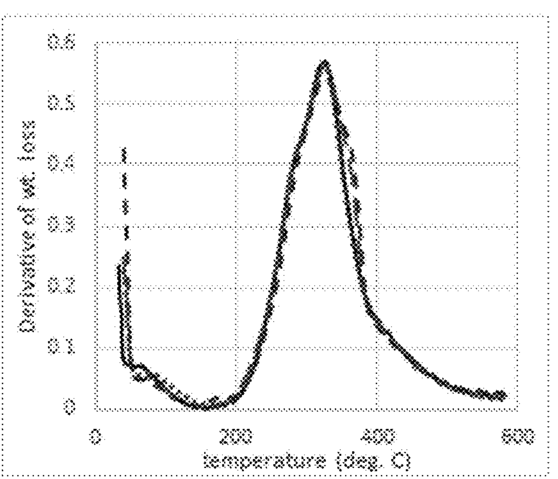
Figure 2C:
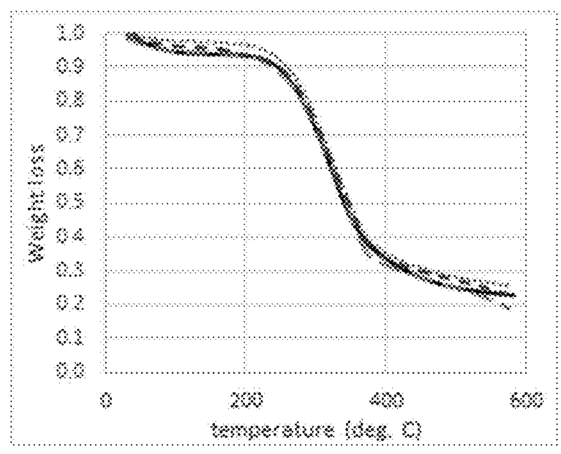
Figure 2D:
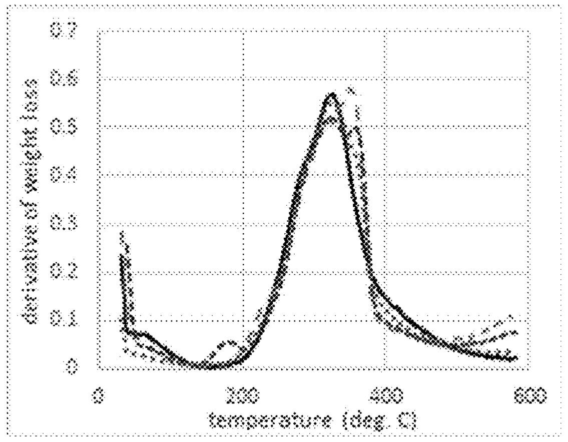

The TGA and derivative thermogravimetry (DTG) data for CPI with 45 mM of the three modifiers are given in FIG. 2A and FIG. 2B, respectively. All the TGA curves showed a 2-4% of weight loss between 50° and 150° C. due to loss of moisture and methanol from threonine. The weight loss became more pronounced over the range 220° to 380° C. due to degradation of the peptide bonds. Above 400° C., chars started to form. These observations were similar to what was previously observed for the TGA of CPI (Cheng et al., 2017c; Villalpando, A., et al., Textile Res. J., 89: 1725-1733 (2019)). The DTG curves for the same four samples showed a maximum value at about 325° C. (FIG. 2B and FIG. 2D). Although these curves looked similar, the data for CPI with gallic and caffeic acids contained a second (shoulder) peak at about 30° C. higher in temperature. This second peak became more pronounced when greater concentrations of gallic or caffeic acid (i.e., 179 mM) were used (FIG. 2D). For catechol, however, this shoulder was noticeably smaller. Thus, the three modifiers increase the thermal stability of CPI to a limited degree, and the relative trend was gallic acid≥caffeic acid>catechol.

Figure 3:
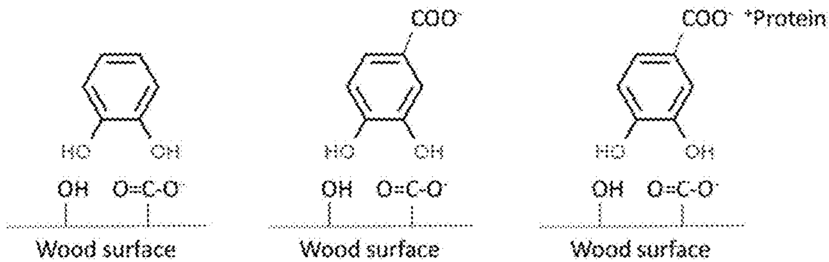
FIG. 3 shows a schematic for the interaction of catechol and catechol derivatives on wood as described herein.

Comments: Catechol is known to interact through hydrogen bonding with itself and with hydroxyl- and carboxyl-containing functionalities on wood (Saiz-Poseu et al., 2019). In addition, the benzene ring can undergo π-stacking interactions, which promote cooperative behavior (Saiz-Poseu et al., 2019). However, catechol by itself only interacts weakly with protein (FIG. 3). Thus, enhanced protein adhesion through the effect of catechol was not expected or observed in this work. However, we found that a carboxylic group when covalently attached to catechol can surprisingly serve as an anchor and bring it close to the protein through Coulombic interactions. The key for enhanced adhesive performance is then to have a strong cationic functionality on the protein. A distinctive feature of cottonseed protein is its high arginine content (11-12%). The guanidinium functionality on arginine has a pKa of 12.5 and carries a net cationic charge at pH values up to 12. Thus, cottonseed protein (with a preponderance of cationic arginine) would have a greater tendency to interact with molecules containing carboxyl functionality, as is the case for gallic and caffeic acids, leading to enhanced adhesion (FIG. 3). In contrast, soy protein has much less arginine (7-8%) and the effect is weaker.

In an earlier study (Cheng et al., 2016b), several low-molecular-weight carboxyl-containing compounds were shown to enhance the dry adhesive strength of cottonseed protein; thus our present result was consistent with previous studies. However, in the previous study these low-molecular-weight carboxyl-containing compounds have not shown enhanced hot-water resistance. The advantage of catechol-containing compounds is surprisingly the enhanced hot-water resistance at 45 mM concentration. However, at 179 mM concentration, the hot water resistance decreased. Probably at higher concentrations of these modifiers, all the accessible arginine units on cottonseed protein are oversaturated with the carboxyls. When the wood strips are immersed in water, the modifiers move around, and the excess carboxyl groups can complex directly on the hydroxyls and carboxyls on the wood surface, thereby reducing adhesion to wood. The reduced performance on the soak test observed for the 179 mM concentrations of modifiers can be explained in the same manner.

In support of the above assertions, an estimate can be made of the comparable amounts of arginine and modifier. In each formulation, we started with 1.5 g CPI and a 45 or 179 mM concentration of modifier in 12.5 grams of solution. If the arginine content in CPI is assumed to be 11.5%, then the amount of arginine in the formulation is 0.173 g or 0.99 mmole. For the 45 mM additive, the amount of modifier is 0.625 mmole. Thus, the molar amounts of arginine and modifier are comparable; it is possible that a fraction of the arginine may be sterically buried within the protein structure and not accessible. However, at 179 mM concentration the amount of additive is 2.5 mmoles, or about 2-3 times more than the amount of arginine present. It is therefore not surprising to see different modifier behavior at 45 mM and 179 mM.

Conclusions: In this work, gallic and caffeic acid surprisingly showed substantial enhancement in dry adhesive strength of CPI when present at 45 mM and 179 mM concentrations. However, for hot water resistance and soak test, these modifiers were surprisingly only beneficial at 45 mM concentration. In contrast, catechol showed no improved adhesive performance over CPI alone. As for SPI, gallic and caffeic acids exhibited marginal improvement in dry adhesive strength at 179 mM, but no observable data for hot water resistance and soak test.

These results can be rationalized in view of the need for the catechol structure to be anchored to a cationic protein through its carboxylic acid functionality. Because CPI has a high percentage of arginine, which is cationic and can interact with the carboxyl group in gallic and caffeic acids, these two acids exhibit a promoting effect on CPI adhesion. As SPI has a lower amount of arginine, this cation/anion interaction is weaker, leading to only marginal improvements in adhesive performance.

Thus, our study revealed two examples of new promoters for CPI adhesion and also provided some mechanistic information concerning the adhesion of catechol structure. It may be noted that gallic acid is widely present in plants and found in free form or as a derivative in nuts, tea, and many fruits and vegetables. Caffeic acid is found in all plants because it is a key intermediate in the biosynthesis of lignin. Thus, the combinations involving CPI, gallic acid and caffeic acid can be regarded as green adhesives.

All of the references cited herein, including U.S. Patents and U.S. Patent Application Publications, are incorporated by reference in their entirety. Also incorporated by reference in their entirety are the following references: U.S. Pat. No. 10,023,777 (0115.16); Ahn, B. K., J. Am. Chem. Soc., 139: 10166-10171 (2017); Cheng, H. N., et al., J. Adhes. Sci. Tech., 33: 66-78 (2019a); Forooshani, P. K., and B. P. Lee, J. Polym. Sci., Part A: Polym. Chem., 55: 9-33 (2017); North, M. A., et al., ACS Appl. Mater. Interf., 8: 7866-7872 (2017); Saiz-Poseu, J., et al., Angew. Chem. Int. Ed., 58 (3): 696-714 (2019); Wilke, P., et al., J. Am. Chem. Soc., 136: 12667-12674 (2014)).

Thus, in view of the above, there is described (in part) the following:

An adhesive composition, said adhesive composition comprising (consisting essentially of or consisting of) a cottonseed protein and a catechol compound containing a carboxyl group, and optionally a carrier.

The above adhesive composition, wherein said cottonseed protein is selected from the group consisting of cottonseed protein, cottonseed protein isolate, cottonseed protein concentrate, cottonseed protein flour, water-washed cottonseed protein flour or meal, buffer-washed cottonseed protein flour or meal, and mixtures thereof.

A process for producing an adhesive composition, said process comprising (consisting essentially of or consisting of) mixing a cottonseed protein and a catechol compound containing a carboxyl group, and optionally a carrier.

The above process, wherein the pH of said process is from about 4 to about 12.

A method of bonding a first article to a second article, said method comprising (consisting essentially of or consisting of) (a) producing an adhesive composition by mixing a cottonseed protein and a catechol compound containing a carboxyl group, and optionally a carrier at a pH of about 4 to about 12 and at a temperature of about 20° to about 60° C.; (b) depositing on a surface of said first article said adhesive composition thereby creating a binding area; and (c) contacting said binding area with a surface of said second article; and (d) applying heat and pressure to bond said first article to said second article.

The above method, wherein said method comprises (consists essentially of or consists of) (d) applying heat at about 60° to about 200° C. and pressure at about 0.4 MPa to about 14 MPa for about 1 minute to about 90 minutes to bond said first article to said second article.

The above method, wherein said first article and said second article are selected from the group consisting of wood veneers, wood layers, wood fibers, and wood particulates.

An adhesive product comprising (consisting essentially of or consisting of) the above adhesive composition.

A product comprising a first article bonded to a second article by the above method.

A method of producing a composite material comprising (consisting essentially of or consisting of): (a) combining wood strands, particles, fibers, or veneers with the above adhesive composition to produce a mixture; and (b) curing the mixture produced by step (a) to produce the composite material.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein).

The invention illustratively disclosed herein suitably may be practiced in the absence of any element (e.g., method (or process) steps or composition components) which is not specifically disclosed herein. Thus, the specification includes disclosure by silence ("Negative Limitations In Patent Claims," AIPLA Quarterly Journal, Tom Brody, 41(1): 46-47 (2013): " . . . . Written support for a negative limitation may also be argued through the absence of the excluded element in the specification, known as disclosure by silence . . . . Silence in the specification may be used to establish written description support for a negative limitation. As an example, in *Ex parte Lin* [No. 2009-0486, at 2, 6 (B.P.A.I. May 7, 2009)] the negative limitation was added by amendment . . . . In other words, the inventor argued an example that passively complied with the requirements of the negative limitation . . . was sufficient to provide support . . . . This case shows that written description support for a negative limitation can be found by one or more disclosures of an embodiment that obeys what is required by the negative limitation . . . ."

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE 1

Dry adhesive strength, hot water resistance (HWR), and soak testing of cottonseed protein isolate (CPI) with different concentrations (Conc) of modifiers

| Modifier | Conc (mM) | Dry strength (MPa)* | % rel to CPI | HWR (MPa)* | % rel to CPI | Soak tensile strength(MPa)* | % rel to CPI |
|---|---|---|---|---|---|---|---|
| 0 | 0 | 2.36 ± 0.18 [c] | 0 | 1.96 ± 0.28 [b,c] | 0 | 0.90 ± 0.14 [a,b] | 0 |
| Gallic acid | 45 | 2.5 ± 0.34 [c] | 18 | 2.86 ± 0.88 [a] | 46 | 0.97 ± 0.17 [a] | 7 |
| Gallic acid | 179 | 2.95 ± 0.33 [b] | 28 | 0.39 ± 0.14 [d] | −80 | 0.70 ± 0.11 [c] | −22 |
| Caffeic acid | 45 | 2.99 ± 0.32 [a,b] | 36 | 2.49 ± 0.52 [a,b] | 27 | 1.01 ± 0.19 [a] | 12 |
| Caffeic acid | 179 | 3.24 ± 0.18 [a] | 40 | 0.35 ± 0.17 [d] | −82 | 0.77 ± 0.23 [b,c] | −15 |
| Catechol | 45 | 2.60 ± 0.21 [c] | 14 | 2.17 ± 1.01 [b,c] | 11 | 0.93 ± 0.12 [a,b] | 3.1 |
| Catechol | 179 | 2.62 ± 0.28 [c] | 15 | 1.61 ± 0.86 [c] | −18 | 0.74 ± 0.17 [c] | −18 |

*Data are given as average ± standard deviations. The data in each column have been subjected to statistical analysis; values with different superscript letters are significantly different at $p < 0.05$ in the analysis of variance.

TABLE 2

Dry adhesive strength, hot water resistance (HWR), and soak testing of soy protein isolate (SPI) with different concentrations (Conc) of modifiers

| Modifier | Conc (mM) | Dry strength (MPa)* | % rel to SPI | HWR (MPa)* | # strips attached** | Soak tensile strength(MPa)* | # strips attached** |
|---|---|---|---|---|---|---|---|
| 0 | 0 | 1.41 ± 0.14 [b] | 0 | 0 | 0 | 0.11 ± 0.07 | 2 |
| Gallic acid | 45 | 1.56 ± 0.10 [a,b] | 11 | 0 | 0 | 0 | 0 |
| Gallic acid | 179 | 1.64 ± 0.11 [a] | 17 | 0 | 0 | 0 | 0 |
| Caffeic acid | 45 | 1.57 ± 0.13 [a,b] | 12 | 0 | 0 | 0.06 | 1 |
| Caffeic acid | 179 | 1.57 ± 0.06 [a,b] | 12 | 0.10 ± 0.05 | 2 | 0.05 | 1 |

TABLE 2-continued

Dry adhesive strength, hot water resistance (HWR), and soak testing of soy protein isolate (SPI) with different concentrations (Conc) of modifiers

| Modifier | Conc (mM) | Dry strength (MPa)* | % rel to SPI | HWR (MPa)* | # strips attached** | Soak tensile strength(MPa)* | # strips attached** |
|---|---|---|---|---|---|---|---|
| Catechol | 45 | 1.43 ± 0.18 [b] | 2 | 0.13 | 1 | 0 | 0 |
| Catechol | 179 | 1.54 ± 0.15 [a,b] | 10 | 0 | 0 | 0 | 0 |

*Data are given as average ± standard deviations. The data in each column have been subjected to statistical analysis; values with different superscript letters are significantly different at $p < 0.05$ in the analysis of variance.

**Number of bonded wood strips that remained attached after water treatment. For each run, 10 bonded wood strips were used. Only strips that stayed attached were tested for adhesive strength.

The invention claimed is:

1. A process for producing an adhesive composition, said process comprising mixing a cottonseed protein with from about 45 mM to about 179 mM of a catechol compound containing a carboxyl group, and optionally a carrier.

2. The process of claim 1, wherein the pH of said process is from about 4 to about 12.

3. A method of bonding a first article to a second article, said method comprising (a) producing an adhesive composition by mixing a cottonseed protein with from about 45 mM to about 179 mM of a catechol compound containing a carboxyl group, and optionally a carrier; at a pH of about 4 to about 12, and at a temperature of about 20° C. to about 60° C.; (b) depositing on a surface of said first article said adhesive composition thereby creating a binding area; (c) contacting said binding area with a surface of said second article; and (d) applying heat and pressure to bond said first article to said second article.

4. The method of claim 3, wherein at step (d) said method comprises applying heat at about 60° C. to about 200° C. and pressure at about 0.4 MPa to about 14 MPa for about 1 minute to about 90 minutes to bond said first article to said second article.

5. The method of claim 3, wherein said first article and said second article are selected from the group consisting of wood veneers, wood layers, wood fibers, and wood particulates.

6. A product comprising a first article bonded to a second article by the method according to claim 3.

* * * * *